US008181266B2

(12) United States Patent
Oh et al.

(10) Patent No.: US 8,181,266 B2
(45) Date of Patent: May 15, 2012

(54) METHOD FOR MOVING A RIGHTS OBJECT BETWEEN DEVICES AND A METHOD AND DEVICE FOR USING A CONTENT OBJECT BASED ON THE MOVING METHOD AND DEVICE

(75) Inventors: Yun-sang Oh, Seoul (KR); Kyung-im Jung, Seongnam-si (KR); Jae-jin Choi, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1402 days.

(21) Appl. No.: 11/330,068

(22) Filed: Jan. 12, 2006

(65) Prior Publication Data

US 2006/0154648 A1    Jul. 13, 2006

(30) Foreign Application Priority Data

May 20, 2005 (KR) .................. 10-2005-0042683

(51) Int. Cl.
*G06F 21/00* (2006.01)
(52) U.S. Cl. .............. 726/31; 726/33; 713/165; 705/59; 455/411
(58) Field of Classification Search .................. 713/200, 713/201; 726/31
See application file for complete search history.

(56) References Cited

U.S. PATENT DOCUMENTS

| | | | |
|---|---|---|---|
| 5,568,552 A * | 10/1996 | Davis ............................. | 705/59 |
| 6,230,247 B1 | 5/2001 | Cannon et al. | |
| 6,412,070 B1 | 6/2002 | Van Dyke et al. | |
| 6,654,754 B1 | 11/2003 | Knauft et al. | |
| 6,799,271 B2 * | 9/2004 | Kugai ............................ | 713/168 |
| 6,901,386 B1 * | 5/2005 | Dedrick et al. ................. | 705/59 |
| 7,062,471 B1 * | 6/2006 | Matsuyama et al. ............ | 705/65 |
| 7,203,966 B2 * | 4/2007 | Abburi et al. .................. | 726/29 |
| 7,568,234 B2 * | 7/2009 | Naslund et al. ................. | 726/26 |

(Continued)

FOREIGN PATENT DOCUMENTS

CN        1536529 A      10/2004

(Continued)

OTHER PUBLICATIONS

Smith, Digital Rights Management & Protecting the Digital Media Value Chain, Oct. 2004 College Park, Maryland, USA, 2004, ACM.*

(Continued)

*Primary Examiner* — Taghi Arani
*Assistant Examiner* — Morshed Mehedi
(74) *Attorney, Agent, or Firm* — Muir Patent Consulting, PLLC

(57) ABSTRACT

A method for moving a rights object (RO) between devices, a method of using a content object based on the moving method, and devices using the methods are provided. The moving method includes performing authentication between two devices; securing a connection between the devices; and communicating the rights object between the two devices. The using method includes two devices communicating with each other, the first device having use permission of content objects and the second device including the content objects and corresponding rights objects; the first device searching for the content objects; and the first device using the content object that was found. The device includes an authentication module to authenticate another device; a security formation module to secure a connection for the other device; and a transceiving module which communicates a rights object for which the connection has been secured.

12 Claims, 11 Drawing Sheets

U.S. PATENT DOCUMENTS

| | | | |
|---|---|---|---|
| 7,711,954 B2 * | 5/2010 | Vantalon et al. | 713/168 |
| 2001/0010045 A1 | 7/2001 | Stefik et al. | |
| 2002/0013772 A1 | 1/2002 | Peinado | |
| 2002/0026424 A1 | 2/2002 | Akashi | |
| 2002/0029199 A1 | 3/2002 | Go et al. | |
| 2002/0029347 A1 | 3/2002 | Edelman | |
| 2003/0005135 A1 * | 1/2003 | Inoue et al. | 709/229 |
| 2003/0018491 A1 * | 1/2003 | Nakahara et al. | 705/1 |
| 2003/0028699 A1 | 2/2003 | Holtzman et al. | |
| 2003/0046541 A1 * | 3/2003 | Gerdes et al. | 713/168 |
| 2003/0076957 A1 | 4/2003 | Asokan et al. | |
| 2003/0093694 A1 * | 5/2003 | Medvinsky et al. | 713/201 |
| 2003/0126086 A1 | 7/2003 | Safadi | |
| 2003/0154408 A1 * | 8/2003 | Zhu et al. | 713/201 |
| 2003/0200458 A1 * | 10/2003 | Hori et al. | 713/200 |
| 2004/0003247 A1 * | 1/2004 | Fraser et al. | 713/169 |
| 2004/0019801 A1 * | 1/2004 | Lindholm et al. | 713/200 |
| 2004/0064692 A1 | 4/2004 | Kahn et al. | |
| 2004/0103312 A1 * | 5/2004 | Messerges et al. | 713/201 |
| 2004/0139315 A1 | 7/2004 | Tokutani et al. | |
| 2004/0172561 A1 * | 9/2004 | Iga | 713/201 |
| 2004/0186853 A1 * | 9/2004 | Yamamoto et al. | 707/104.1 |
| 2004/0249768 A1 * | 12/2004 | Kontio et al. | 705/65 |
| 2004/0268131 A1 * | 12/2004 | Kudo et al. | 713/182 |
| 2005/0022025 A1 | 1/2005 | Hug | |
| 2005/0052924 A1 | 3/2005 | Nishizawa et al. | |
| 2005/0071278 A1 * | 3/2005 | Simelius | 705/52 |
| 2005/0132209 A1 * | 6/2005 | Hug et al. | 713/189 |
| 2005/0243355 A1 | 11/2005 | Foehr et al. | |
| 2005/0268343 A1 * | 12/2005 | Onoda et al. | 726/26 |
| 2005/0277403 A1 * | 12/2005 | Schmidt et al. | 455/410 |
| 2006/0059573 A1 * | 3/2006 | Jung et al. | 726/31 |
| 2007/0027814 A1 * | 2/2007 | Tuoriniemi | 705/59 |
| 2008/0089517 A1 | 4/2008 | Bianco et al. | |

FOREIGN PATENT DOCUMENTS

| | | | |
|---|---|---|---|
| CN | 1537270 A | | 10/2004 |
| CN | 1561025 A | | 1/2005 |
| EP | 1473899 A1 * | | 11/2004 |
| JP | 9-160899 A | | 6/1997 |
| JP | 10-207779 A | | 8/1998 |
| JP | 2002-51037 A | | 2/2002 |
| JP | 2002-124927 A | | 4/2002 |
| JP | 2002-230895 A | | 8/2002 |
| JP | 2002-358241 A | | 12/2002 |
| JP | 2002-358242 | | 12/2002 |
| JP | 2004-110817 | | 4/2004 |
| JP | 2004-220546 A | | 8/2004 |
| JP | 2004-265139 A | | 9/2004 |
| JP | 2005-5821 A | | 1/2005 |
| KR | 10-2003-0044892 A | | 6/2003 |
| KR | 10-2005-0039522 A | | 4/2005 |
| KR | 10-2005-0039523 A | | 4/2005 |
| KR | 10-2006-0011760 A | | 2/2006 |
| WO | 00/74300 A1 | | 12/2000 |
| WO | 03/034428 A2 | | 4/2003 |
| WO | 2004/097605 A1 | | 11/2004 |

OTHER PUBLICATIONS

Soriano, et al, "Mobile Digital Rights Management: Security Requirements and Copy Detection Mechanisms", Database and Expert Systems Applications, 2005. Proceedings. Sixteenth International Workshop on, Aug. 26-26, 2005, pp. 251-256.*

"E4M—Encryption for the Masses"—Published Feb. 4, 2000 as per Wayback Engine, retrieved from internet <http://web.archive.org/web/20000204210550/http://www.e4m.net/main.html>, p. 1-2.

Griswold, R., "Storage Topologies", Computer, Dec. 2002, pp. 56-63, vol. 35, Issue 12.

Derfler, F. et al., "How Networks Work", Bestseller Edition, 1996, all pages, Ziff-Davis Press, Emeryville, CA.

White, R. "How Computers Work", Millennium Edition, 1999, all pages, Que Corporation, Indianapolis, IN.

Gralla, P., "How the Internet Works", Millennium Edition, 1999, all pages, Que Corporation, Indianapolis, IN.

Muller, N., "Desktop Encyclopedia of the Internet", 1999, all pages, Artech House, Inc., Norwood, MA.

Matsuyama, K., et al., "Distributed Digital-Ticket Management for Rights Trading System", Proceedings of the 1st ACM Conference on Electronic Commerce, 1999, pp. 110-118.

White, R., "How Computers Work", Sixth Edition, 2002, chapter 9, Que Corporation, Indianapolis, IN.

* cited by examiner

FIG. 3

| | DESCRIPTION | | Type |
|---|---|---|---|
| VERSION(300) | DRM SYSTEM VERSION | | 1 byte |
| ASSET (320) | Id | ASSET NAME | Not fixed |
| | uid | CONTENT URI | URI (256 byte) |
| | inherit | Subscription id | Not fixed |
| | KeyValue | Content Encryption Key | 128 bits |
| | ... | ... | ... |
| | Idref | RO ID | Not fixed |
| PERMISSION (340) | PLAYBACK | Constraint | Constraint |
| | DISPLAY | Constraint | Constraint |
| | EXECUTE | Constraint | Constraint |
| | PRINT | Constraint | Constraint |
| | EXPORT | mode | Move or Copy | 4 bytes |
| | | Constraint | Constraint | Constraint |
| | ... | ... | ... |

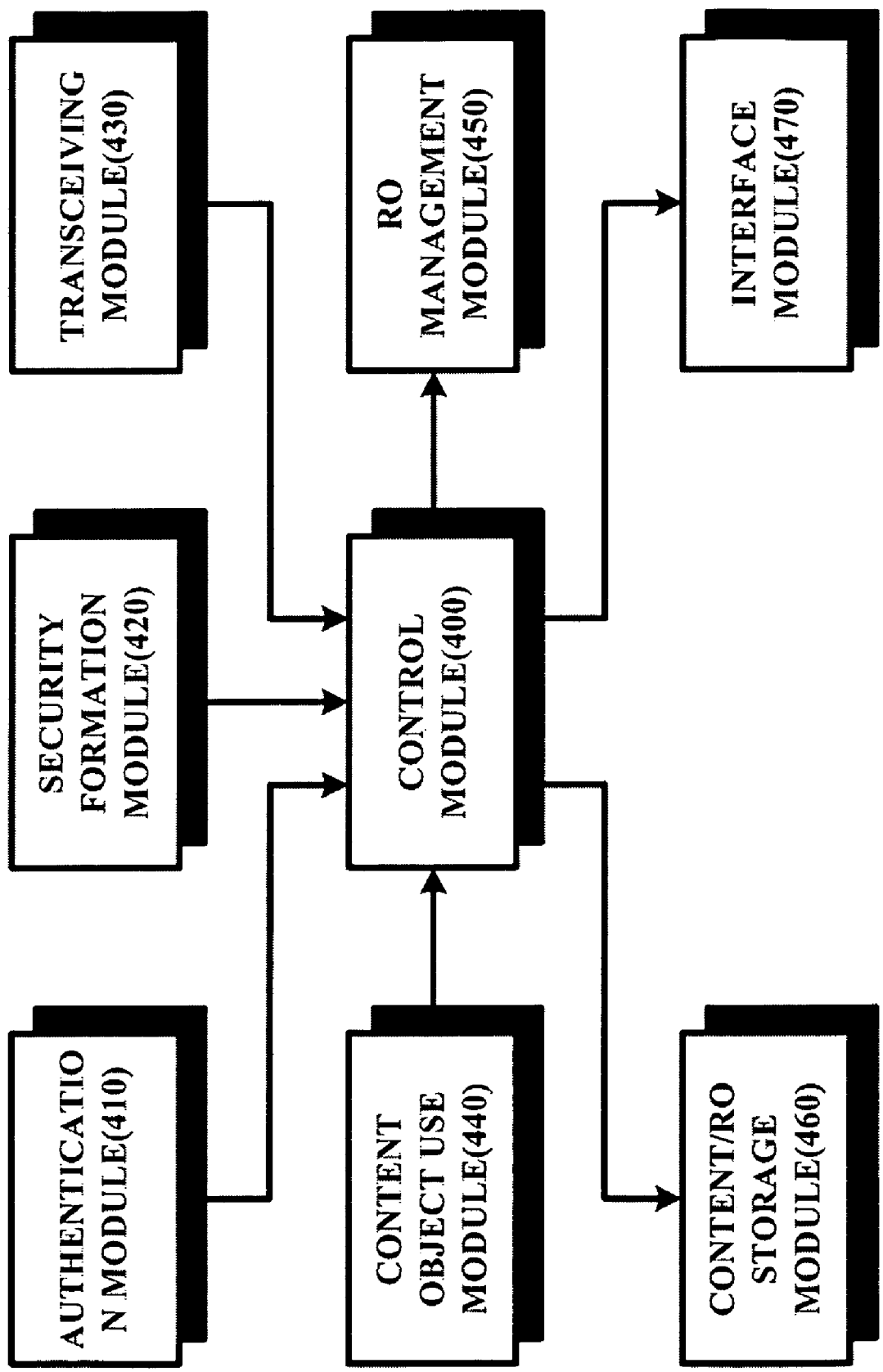

METHOD FOR MOVING A RIGHTS OBJECT BETWEEN DEVICES AND A METHOD AND DEVICE FOR USING A CONTENT OBJECT BASED ON THE MOVING METHOD AND DEVICE

CROSS-REFERENCE TO RELATED APPLICATIONS

This application claims priority from Korean Patent Application No. 10-2005-0042683 filed on May 20, 2005 in the Korean Intellectual Property Office, and from U.S. Provisional Patent Application No. 60/643,150 filed on Jan. 13, 2005 in the United States Patent and Trademark Office, the disclosures of which are incorporated herein by reference in their entirety.

BACKGROUND OF THE INVENTION

1. Field of the Invention

The present invention relates to a digital rights management method and apparatus, and more particularly, to a method and device for moving a rights object (RO) between devices and a method and device for using a content object based on the moving method and device.

2. Description of the Related Art

Recently, digital rights management (DRM) has been actively researched and developed. Commercial services using DRM have already been used or will be used. DRM needs to be used because of the following various characteristics of digital content.

Unlike analog data, digital content can be copied without loss and can be easily reused, processed, and distributed, and only a small amount of cost is needed to copy and distribute the digital content. However, a large amount of cost, labor, and time are needed to produce the digital content. Thus, when the digital content is copied and distributed without permission, a producer of the digital content may lose profit, and enthusiasm for creation may be discouraged. As a result, development of digital content business may be hampered.

There were several efforts to protect digital content. Conventionally, digital content protection has been concentrated on preventing non-permitted access to digital content, permitting only people who have paid charges to access the digital content. Thus, people who have paid charges for the digital content are allowed to access and decrypt digital content while people who have not paid charges are not allowed to access and decrypt digital content. However, when a person who has paid charges intentionally distributes the digital content to other people, the other people can use the digital content without paying charges.

To solve this program, DRM was introduced. In DRM, anyone is allowed to freely access encoded digital content, but a license, referred to as a rights object, is needed to decode and execute the digital content. Accordingly, the digital content can be more effectively protected by using DRM.

FIG. 1 is a diagram illustrating typical digital rights management (DRM). DRM generally involves handling content that is protected by being encrypted or scrambled and handling licenses allowing access to such encrypted content.

FIG. 1 illustrates a plurality of devices, e.g. device A (110) and device B (150), which desire to access encrypted content, a content provider 120 which provides content, a rights object (RO) issuer 130 which issues an RO containing a license for executing content, and a certificate authority 140.

The device A (110) obtains desired content from the content provider 120, wherein the desired content is encrypted content. The device A (110) purchases an RO containing a license for using the encrypted content from the RO issuer 130. Thereafter, the device A (110) can use the encrypted content using the purchased RO.

Encrypted content can be freely circulated or distributed. Therefore, the device A (110) can freely transmit encrypted content to device B (150). In order for the device B (150) to play back the encrypted content transmitted by the device A (110), the device B (150) needs an RO which can be purchased from the RO issuer 130.

The certificate authority 140 issues a certificate signed with a message specifying an identifier of a device whose public key has been identified, a certificate number, the name of the certificate authority 140, and the expiration dates of the public key of the device and the certificate. The devices, e.g. device A (110) and device B (150), can determine whether devices currently communicating with them are legitimate devices by referencing certificates of the devices issued by the certificate authority 140. The devices may be equipped with certificates issued by the certificate authority 140 when manufacturing the devices A (110) and B (150). The devices A (110) and B (150) may have their certificates reissued by the certificate authority 140 when their certificates expire.

Certificates issued to devices by the certificate authority 140 are signed with a private key of the certificate authority 140. Thus, devices can examine certificates issued to other devices which are currently communicating with them using their public keys. Certificates issued by the certificate authority 140 may be stored in places that are easily accessible by devices or may be stored in the devices.

FIG. 1 illustrates that an RO and encrypted content are directly transmitted between the device A (110) and the device B (150). However, recently, methods of transmitting an RO and encrypted content between devices via a portable storage device have been developed.

In such portable storage device-based methods, a device can store an RO in a portable storage device and can use encrypted content using the RO stored in the portable storage device. Therefore, DRM may also be applied to communication between a device and a portable storage device, which is illustrated in FIG. 2.

FIG. 2 is a diagram illustrating DRM for communication between a portable storage device and a device. Referring to FIG. 2, a device A (210) can obtain encrypted content from a content provider 220. The encrypted content is content protected through DRM. To use, e.g. to play, the encrypted content, a Rights Object (RO) for the encrypted content is needed. An RO contains a definition of a right, a right to content, and constraints to the right and may further include a right to the RO itself. An example of the right to the content may be a playback, or other rights known in the art. Examples of the constraints may be the number of playbacks, a playback time, and a playback duration, or other constraint known in the art. An example of the right to the RO may be a move or a copy, or other right to the RO known in the art. In other words, an RO containing a right to move may be moved to another device or a secure multi media card (MMC). An RO containing a right to copy may be copied to another device or a secure MMC. When the RO is moved, the original RO before the move is deactivated (i.e., the RO itself is deleted or a right contained in the RO is deleted). However, when the RO is copied, the original RO may be used in an activated state even after the copy.

Referring to FIG. 2, the device A (210) receives encrypted content from the content provider 220 and issues a request for an RO to an RO issuer 230 to obtain a right to play back the encrypted content. When receiving the RO from the RO issuer 230, the device A (210) can play back the encrypted content using the RO. The device A (210) may transmit the RO to the device B (250), which possesses the encrypted content, using a portable storage device. The portable storage device may be a secure multimedia card 260 having a DRM function. In this case, the device A (210) and the secure multimedia card 260 authenticate each other, and the device A (210) transmits the RO to the secure multimedia card 260. Then, in order to play back the encrypted content, the device A (210) may issue a request for the RO to the secure multimedia card 260 and receive a right to play back the encrypted content, i.e., a content encryption key, from the secure multimedia card 260 in return. The secure multimedia card 260 and the device B (250) authenticate each other. Then, the secure multimedia card 260 may transmit the RO to the device B (250) or may allow the device B (250) to play back the encrypted content.

As described above, in conventional DRM methods, an RO and a content object are transmitted from a service provider to arbitrary devices. Therefore, in order for a device to use a content object, the device must have both the content object and an RO corresponding to the content object. In addition, a consumed RO cannot be exposed outside the device where the consumed RO is currently located, with current state information of the consumed RO kept intact. Therefore, a user may not be able to properly maintain the RO for which the user has already made payment when purchasing a new device or replacing the device with another device.

SUMMARY OF THE INVENTION

The present invention provides a method and apparatus for transmitting a rights object (RO) between devices, and a method and apparatus for using a content object in which an RO can be transmitted from one device to another together with current state information of the RO and a device can use a content object not only by consuming an RO stored in the device but also by consuming an RO stored in another device.

These and other aspects of the present invention will be described in or be apparent from the following description of exemplary embodiments of the invention.

According an exemplary embodiment of the present invention, there is provided a method of moving a rights object (RO) including two arbitrary devices authenticating each other, securing a connection between the two arbitrary devices, and communicating an RO between the two arbitrary authenticated devices.

According to another exemplary embodiment of the present invention, there is provided a method of using content objects including a first device and a second device communicating with each other, the first device having use permission of content objects and the second device including the content objects and rights objects corresponding to the content objects; the first device searching for the content objects of the second device; and the first device using the content object from the second device found as a result of the search.

According to still another exemplary embodiment of the present invention, there is provided a device including an authentication module which is configured to authenticate another device; a security formation module which is configured to secure a connection for the another device that has been authenticated by the authentication module; and a transceiving module which transmits or receives a rights object for which the connection has been secured by the security formation module.

According to yet another exemplary embodiment of the present invention, there is provided a device of using a content object including a rights object management module which is configured to manage rights objects by searching for devices storing a desired content object and a rights object corresponding thereto; a transceiving module which is configured to send request information for use permission of the desired content object to a device on which the rights object is stored and to receive the use permission of the desired content object from the device on which the rights object is stored; and a content object use module which is configured to use the desired content object.

BRIEF DESCRIPTION OF THE DRAWINGS

The above and other aspects of the present invention will become more apparent by describing in detail certain exemplary embodiments thereof with reference to the attached drawings in which:

FIG. 3 is a diagram illustrating the format of a rights object (RO) according to an exemplary embodiment of the present invention;

FIG. 4 is a block diagram of a device of moving ROs between devices according to an exemplary embodiment of the present invention;

DETAILED DESCRIPTION OF EXEMPLARY EMBODIMENTS OF THE INVENTION

Figure 1:
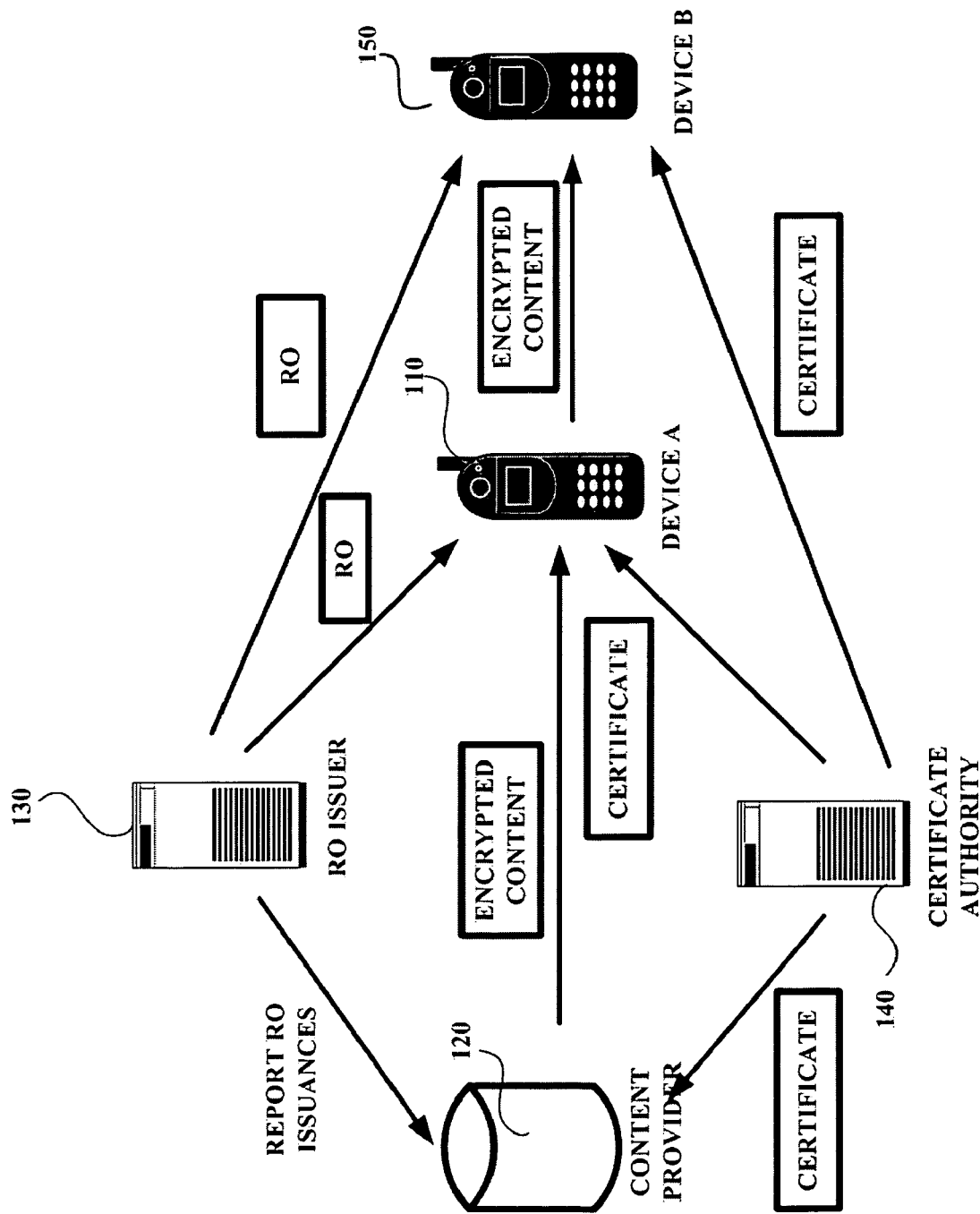
FIG. 1 is a diagram illustrating typical digital rights management (DRM)
Figure 2:
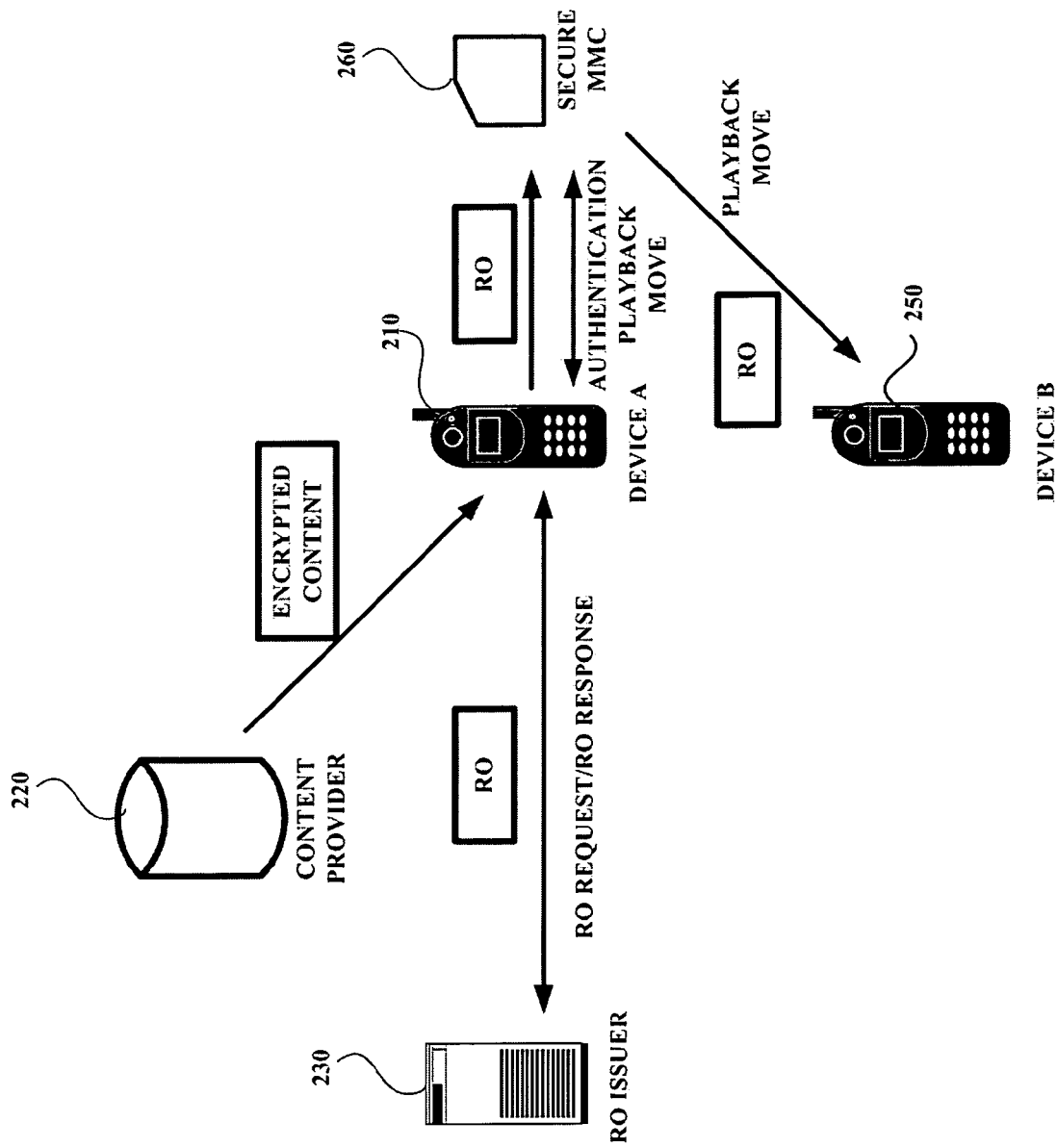
FIG. 2 is a diagram illustrating DRM for communication between a portable storage device and a device.

Advantages and aspects of the present invention and methods of accomplishing the same may be understood more readily by reference to the following detailed description of exemplary embodiments and the accompanying drawings. The present invention may be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Before the detailed description is set forth, terms used in this specification will be described briefly. The description of terms is provided to convey a better understanding of the specification to those having ordinary skill in the art, and terms that are not explicitly defined herein are not intended to limit the broad aspect of the invention.

Public-Key Cryptography

Public-key cryptography is referred to as an asymmetric cipher in which a key used for encryption is different from a key used for decryption. A public-key algorithm is open to the public, but it is impossible or difficult to decrypt original content with only a cryptographic algorithm, an encryption key, and ciphered text. Examples of a public-key cryptographic system include Diffie-Hellman cryptosystems, Rivest-Shamir-Adleman (RSA) cryptosystems, ElGamal cryptosystems, elliptic curve cryptosystems, or other cryptosystems known in the art. The public-key cryptography is about 100-1000 times slower than symmetric-key cryptography and is thus usually used for key exchange and digital signature not for encryption of content.

Symmetric-Key Cryptography

Symmetric-key cryptography is a symmetric cipher referred to as secret-key cryptography using the same key encryption and decryption. A data encryption standard (DES) is a most usual symmetric cipher. Recently, applications using an advanced encryption standard (AES) have increased.

Digital Signature

A digital signature is generated by a signer to indicate that a document has been written. Examples of a digital signature are an RSA digital signature, an ElGamal digital signature, a Digital Signal Algorithm (DSA) digital signature, a Schnorr digital signature, or other digital signature known in the art. When the RSA digital signature is used, a sender encrypts a message with the sender's private key and sends the encrypted message to a recipient. The recipient decrypts the encrypted message. In this case, it is proved that the message has been encrypted by the sender.

Certificate

A certification authority certifies users of a public key with respect to a public-key cipher. A certificate is a message containing a public key and a person's identity information which are signed by the certification authority using a private key. Accordingly, the integrity of the certificate can be easily considered by applying the public key of the certification authority to the certificate, and therefore, attackers are prevented from modulating a user's public key.

Random Number

A random number is a sequence of numbers or characters with random properties. Since it is expensive to generate a complete random number, a pseudo-random number may be used.

Portable Storage Device

A portable storage device used in the present invention includes a non-volatile memory such as a flash memory which data can be written to, read from, and deleted from and which can be connected to a device. Examples of such portable storage device are smart media, memory sticks, compact flash (CF) cards, xD cards, multimedia cards, or other portable storage devices known in the art.

Rights Object

A rights object is a kind of license, which includes a right to use an encrypted content or constraints to the right. The term "the rights object" used in the present invention will be described in more detail with reference to FIG. 3.

FIG. 3 is a diagram illustrating the format of a rights object (RO) according to an exemplary embodiment of the present invention.

Referring to FIG. 3, the RO includes a version field 300, an asset field 320, and a permission field 340.

The version field 300 contains version information of a DRM system. The asset field 320 contains information regarding content data, the consumption of which is managed by the RO. The permission field 340 contains information regarding usage and action that are permitted by a right issuer with respect to the content protected through DRM.

The information stored in the asset field 320 will now be described in detail.

The "id" information indicates an identifier used to identify the RO. The "uid" information is used to identify the content the usage of which is dominated by the RO and is a uniform resource identifier (URI) of content data of a DRM content format (DCF).

The "KeyValue" information contains a binary key value used to encrypt the content, which is referred to as a content encryption key (CEK). The CEK is a key value used to decrypt encrypted content to be used by a device. When the device receives the CEK from a secure MMC, it can use the content.

The permission field 340 is a right to use content permitted by the right issuer. Types of permission include "Play", "Display", "Execute", "Print", "Export", or other known permissions in the art.

"Playback" is a right to display DRM content in an audio/video format. For example, if the encrypted content is a movie or music file, the Play permission may optionally have a constraint. If a specified constraint is present, the DRM agent grants a right to Play according to the specified constraint. If no specified constraints are present, the DRM agent grants unlimited Play rights.

The "Display" permission indicates a right to display DRM content through a visual device. A DRM agent does not allow access based on Display with respect to content such as gif or jpeg images that cannot be displayed through the visual device. Here, the DRM agent may be a control module, which will be described later in detail with reference to FIG. 7.

The "Display" permission indicates a right to display DRM content through a visual device.

The "Execute" permission indicates a right to execute DRM content such as JAVA games and other application programs.

The "Print" permission indicates a right to generate a hard copy of DRM content such as jpeg images.

The "Play" permission, the "Display" permission, the "Execute" permission, and the "Print" permission will hereinafter collectively be generally referred to as playback permission.

The "Export" permission indicates a right to send DRM contents and corresponding ROs to a DRM system other than an open mobile alliance (OMA) DRM system or a content protection architecture.

The "Export" permission must have a constraint. The constraint specifies a DRM system of a content protection architecture to which DRM content and its RO can be sent. The Export permission is divided into a move mode and a copy mode. When an RO is exported from a current DRM system to another DRM system, the RO is deactivated from the current DRM system in the move mode but is not deactivated from the current DRM system in the copy mode.

FIG. 4 is a block diagram of a device for moving ROs between devices according to an exemplary embodiment of the present invention.

Referring to FIG. 4, the device includes a control module 400, an authentication module 410, a security formation module 420, a transceiving module 430, a content object use module 440, an RO management module 450, a content/RO storage module 460, and an interface module 470.

In the present and following embodiments, a module means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, variables, or other similar components known in the art. The functionality provided for in the components and modules may be combined into fewer components and modules or further separated into additional components and modules.

The authentication module 410 enables authentication between devices that transmit/receive an RO to/from each other. The security formation module 420 forms security between the devices.

The transceiving module 430 allows the devices to transmit/receive an RO to/from each other in a secure state. If a content object and an RO corresponding to the content object are located in different devices and the transceiving module 430 is included in the device that stores the content object, the transceiving module 430 may issue a request for the RO to the device that stores the RO, and receive the RO from the device that stores the RO.

The content object use module 440 uses a content object stored in the device or in another device.

If a content object to be used by the device and an RO corresponding to the content object are located in different devices and the RO management module 450 is included in the device that stores the content object, the RO management module 450 searches for the device that stores the RO.

The content/RO storage module 460 stores content objects and respective corresponding ROs.

The interface module 470 enables a device which does not possess a content object and a device which possesses both the content object and an RO corresponding to the content object to communicate with each other.

The control module 400 controls the authentication module 410, the security formation module 420, the transceiving module 430, the content object use module 440, the RO management module 450, the content/RO storage module 460, and the interface module 470 and searches for the device or another device for a content object.

A method of transmitting an RO between devices according to an exemplary embodiment of the present invention will now be described in detail with reference to FIG. 5.

Figure 5:
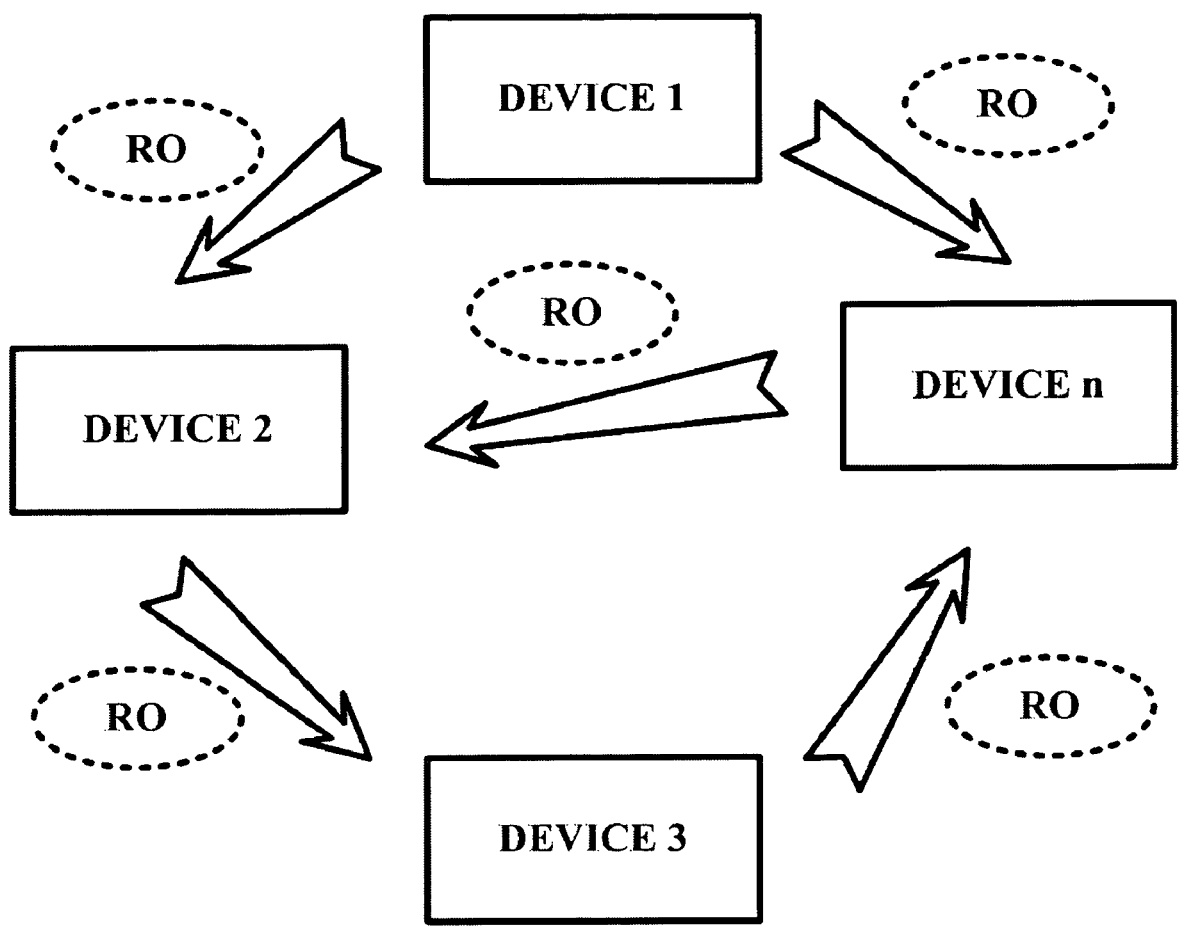
FIG. 5 is a diagram illustrating a procedure in which ROs are moved among devices according to an exemplary embodiment of the present invention.
Figure 8:
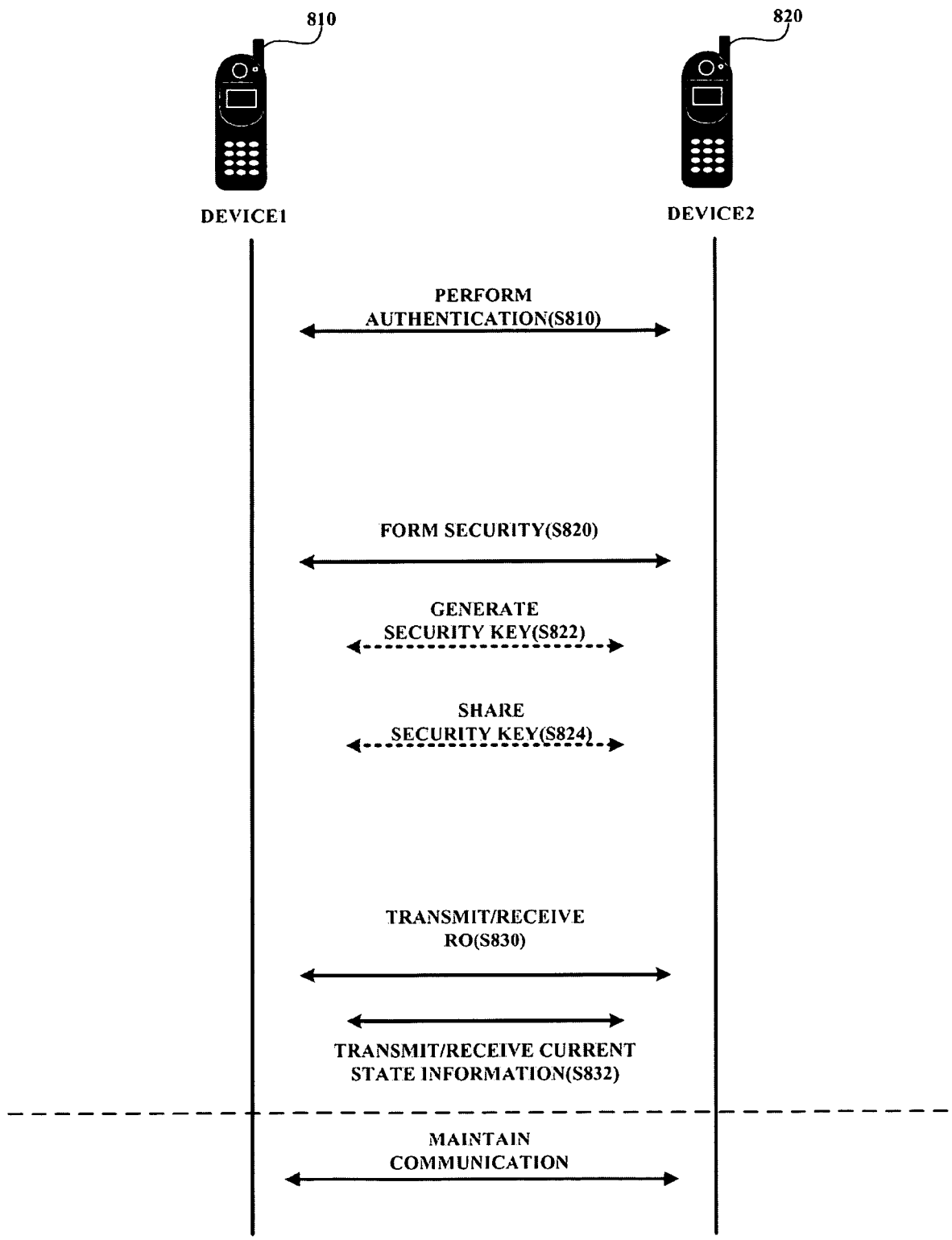
FIG. 8 is a flowchart illustrating a method of moving ROs between devices according to an exemplary embodiment of the present invention.

FIG. 5 is a diagram illustrating a procedure in which ROs are moved among a plurality of devices according to an exemplary embodiment of the present invention, and FIG. 8 is a flowchart illustrating a method of moving the ROs among the plurality of devices according to an exemplary embodiment of the present invention, illustrating movement of the ROs sequentially over time.

Referring to FIG. 5, devices 1 through n can freely transmit/receive ROs to/from one another. A method of transmitting an RO between two devices without the aid of a portable storage device will now be described in detail with reference to FIG. 8.

Referring to FIG. 8, two arbitrary devices are respectively labeled as device 1 (810) and device 2 (820). In operation S810, devices 1 and 2 authenticate each other. Here, the authentication between devices 1 and 2 may be carried out using a typical authentication method.

In operation S820, a security formation module 420 forms security between devices 1 and 2. In detail, the formation of security involves generating a security key (operation S822) and allowing devices 1 and 2 to share the security key with each other (operation S824). In operation S830, a transceiving module (not shown) of one of devices 1 and 2, which stores an RO, communicates with a transceiving module (not shown) of the other, which needs to receive the RO. When the RO is transmitted between devices 1 and 2, current state information specifying a consumption state of the RO may be transmitted between devices 1 and 2 together with the RO. An RO provider may decide whether to transmit the current state information together with the RO. In other words, if the RO provider would like to allow only a limited number of rights contained in the RO to be used according to constraints regarding the RO, the RO provider may decide to transmit the current state information together with the RO. On the other hand, if the RO provider would like to allow all of the rights contained in the RO to be used regardless of the constraints regarding the RO, the RO provider may decide not to transmit the current state information together with the RO. This decision may be made arbitrarily by the RO provider.

A method of using a content object stored in a device regardless of whether an RO corresponding to the content object is stored in the device or in another device according to an exemplary embodiment of the present invention will now be described in detail with reference to FIGS. 6 and 9.

Figure 6:
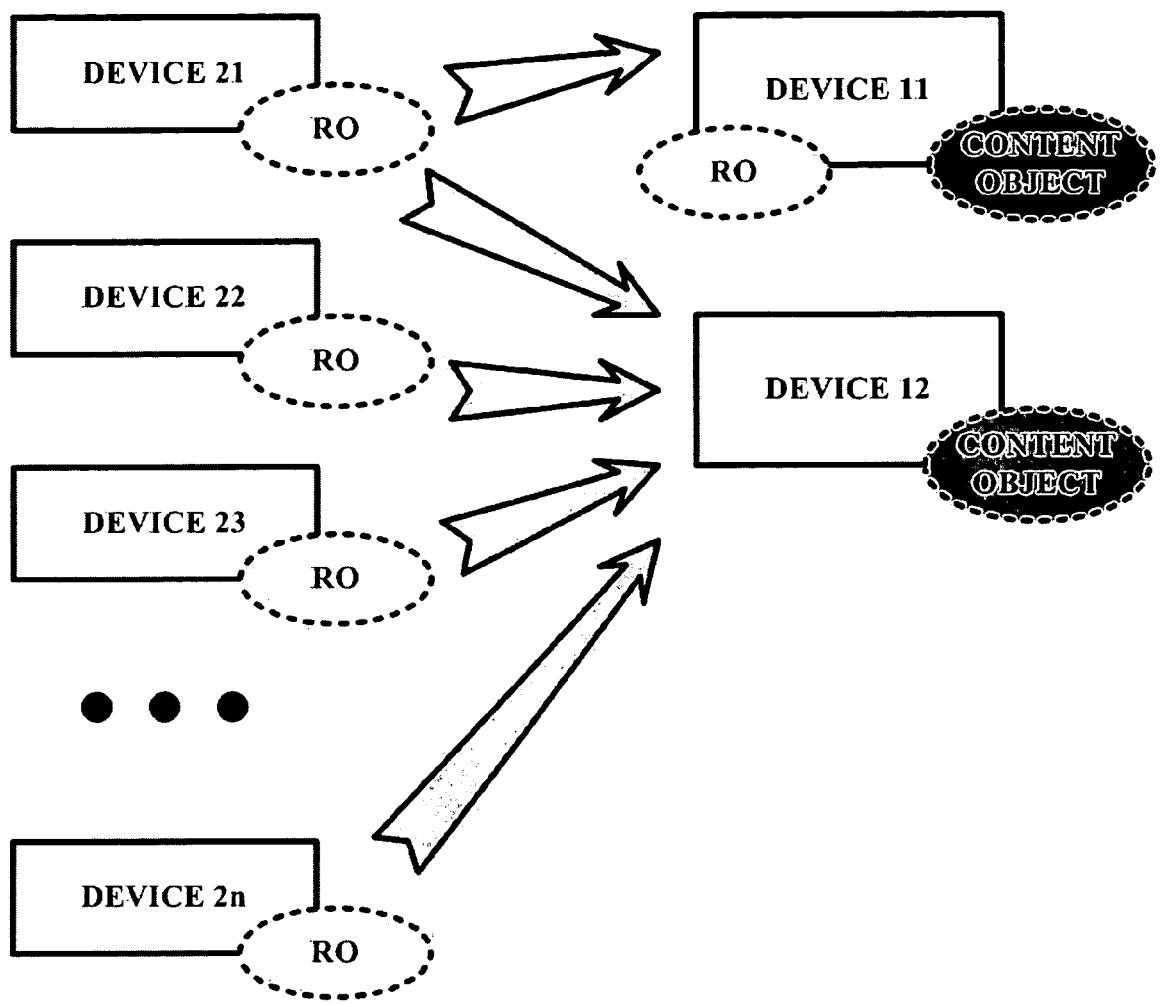
FIG. 6 is a diagram illustrating a method of using content objects and consuming ROs according to an exemplary embodiment of the present invention.

FIG. 6 is a diagram illustrating a method of using content objects and consuming ROs according to an exemplary embodiment of the present invention.

Referring to FIG. 6, for convenience, a device which stores a content object will now be referred to as a content object storage device, and a device which only stores an RO will now be referred to as a RO-only storage device. Device 11, which is a content object storage device, can use a content object stored in device 11 by consuming both an RO stored in device 11 and an RO stored in device 21, which is a RO-only storage device, at the same time or by only consuming the RO stored in device 11. On the other hand, device 12, which is also a content object storage device, does not have an RO and can thus use a content object stored in device 12 by consuming a plurality of ROs respectively stored in devices 21, 22, 23, . . . , 2n. In other words, a content object can be used by consuming a plurality of ROs respectively stored in a plurality of devices, and an RO can be consumed for a plurality of content objects respectively stored in a plurality of devices.

This will now be described in further detail with reference to FIG. 9. FIG. 9 is a flowchart illustrating a method of using a content object according to an exemplary embodiment of the present invention. Referring to FIG. 9, for convenience, a device which stores a content object will now be referred to as a first device 910, and a device which only stores an RO will now be referred to as a second device 920.

In operation S910, an RO management module 450 of the first device 910 determines whether an RO corresponding to a content object stored in the first device 910 is stored in the first device 910. In operation S912, if the RO corresponding to the content object stored in the first device 910 is determined, in operation S910, not to be stored in the first device 910, an authentication module 410 of the first device 910 authenticates the second device 920, and an authentication module 410 of the second device 920 authenticates the first device 910. The authentication between the first device 910 and the second device 920 may be carried out using a typical authentication method. In operation S914, a security formation module 420 of the first device 910 forms security between the first device 910 and the second device 920.

The formation of security between the first device 910 and the second device 920 may involve generating a security key and making the first device 910 and the second device 920 share the security key as described above with reference to FIG. 8.

In operation S920, a transceiving module 430 of the first device 910 sends request information for use permission of the content object stored in the first device 910 to the second device 920. In operation S930, the second device 920 receives the request information sent from by the first device 910 and grants the permission to use the content object stored in the first device 910 to the first device 910, and the first device 910 receives the use permission of the content object stored in the first device 910. In operation S940, a content object use module 440 of the first device 910 uses the content object stored in the first device 910. The transmission of the request information sent from the first device 910 and the use permission of the content object stored the first device 910 may be carried out in a secure state.

Figure 9:
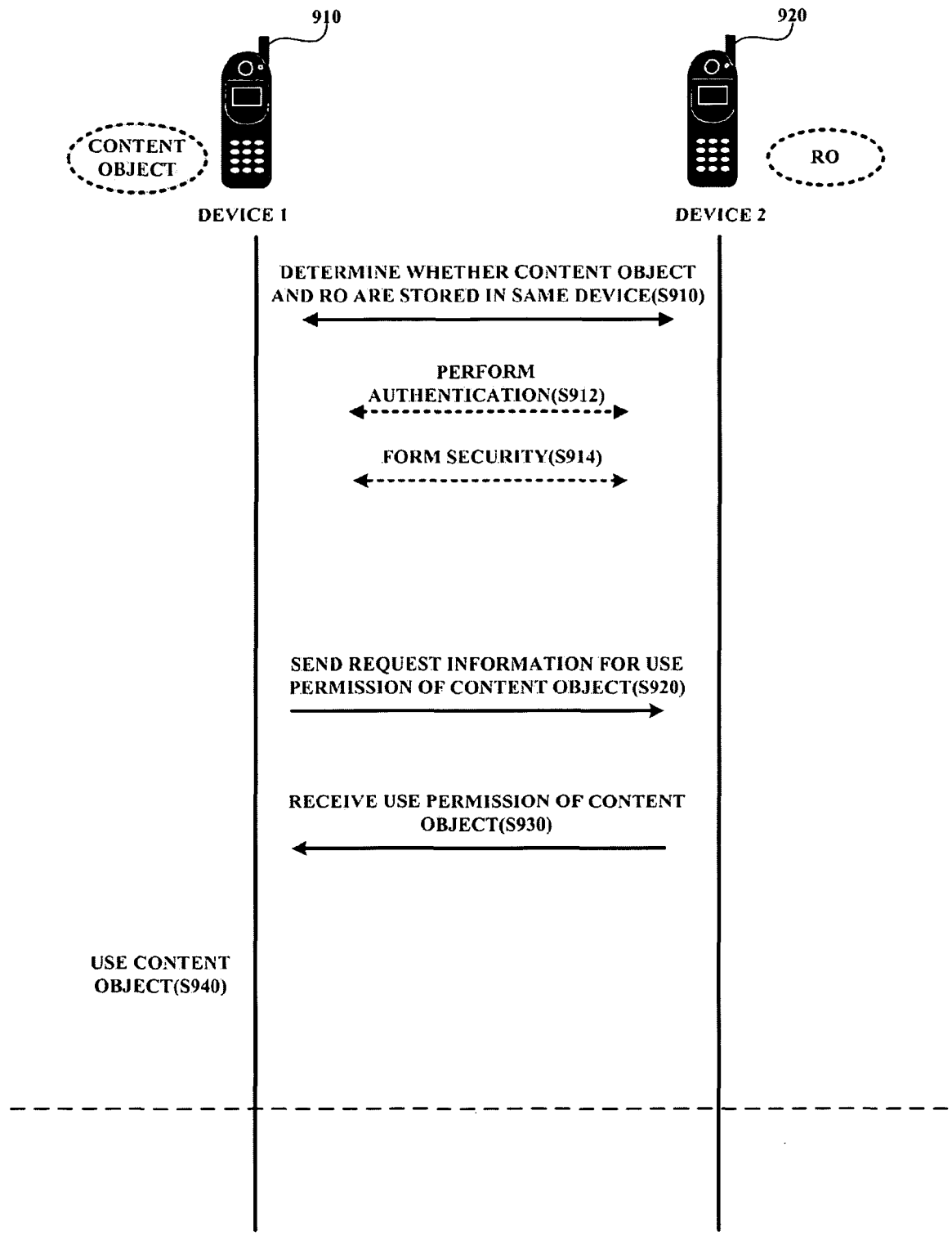
FIG. 9 is a flowchart illustrating a method of using content objects and consuming ROs according to an exemplary embodiment of the present invention.

The first device 910 is illustrated in FIG. 9 as only storing a content object. The first device 910, however, may store both a content object and an RO corresponding to the content object and consume the RO as described above with reference to FIG. 6. Also, the first device 910 may consume two or more ROs at the same time or may use a plurality of content objects by consuming a single RO as described above with reference to FIG. 6.

A method of enabling a device which does not have a content object and an RO to use a content object stored in another device according to an exemplary embodiment of the present invention will now be described in detail with reference to FIGS. 7 and 10.

Figure 7:
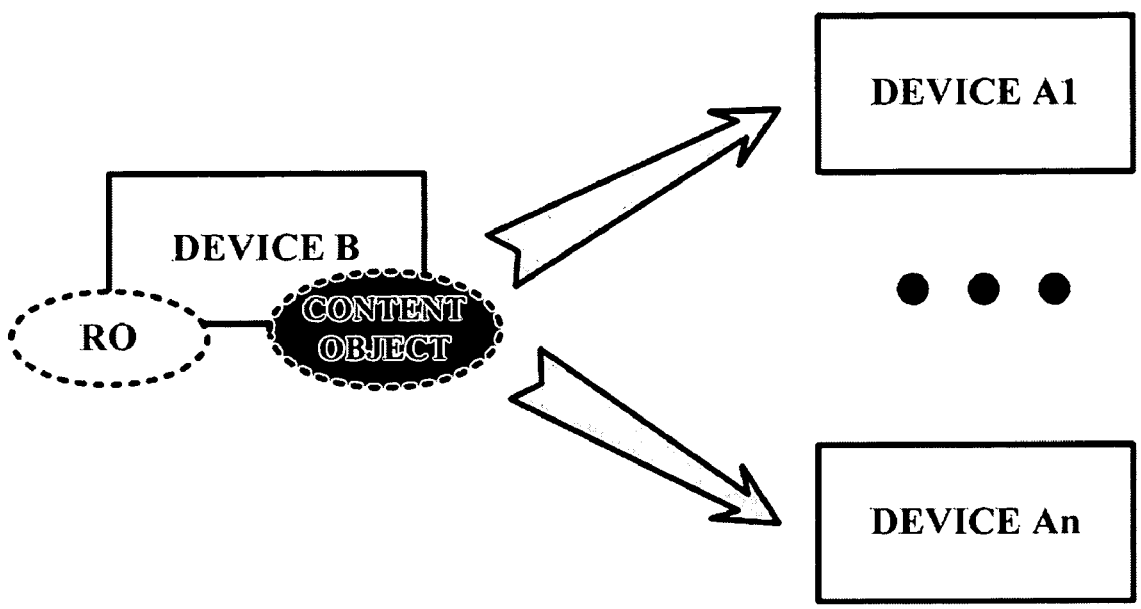
FIG. 7 is a diagram illustrating the use of content objects stored in one device by means of another device according to an exemplary embodiment of the present invention.

FIG. 7 is a diagram illustrating the use of content objects stored in one device by means of another device according to an exemplary embodiment of the present invention.

Referring to FIG. 7, devices A1, . . . , and An do not have content objects and simply consume content objects stored in other devices. On the other hand, device B stores both an RO and a content object. The content object stored in device B may be used by device A1, in which case, the RO stored in device B is consumed by device A1. Once the use of the content object stored in device B by device A1 is terminated, the content object may also be used by device An, in which case, the RO stored in device B is also consumed by device An.

This exemplary embodiment of the present invention will now be described in further detail with reference to FIG. 10. FIG. 10 is a flowchart illustrating a method of using content objects stored in one device by means of another device according to an exemplary embodiment of the present invention.

Figure 10:
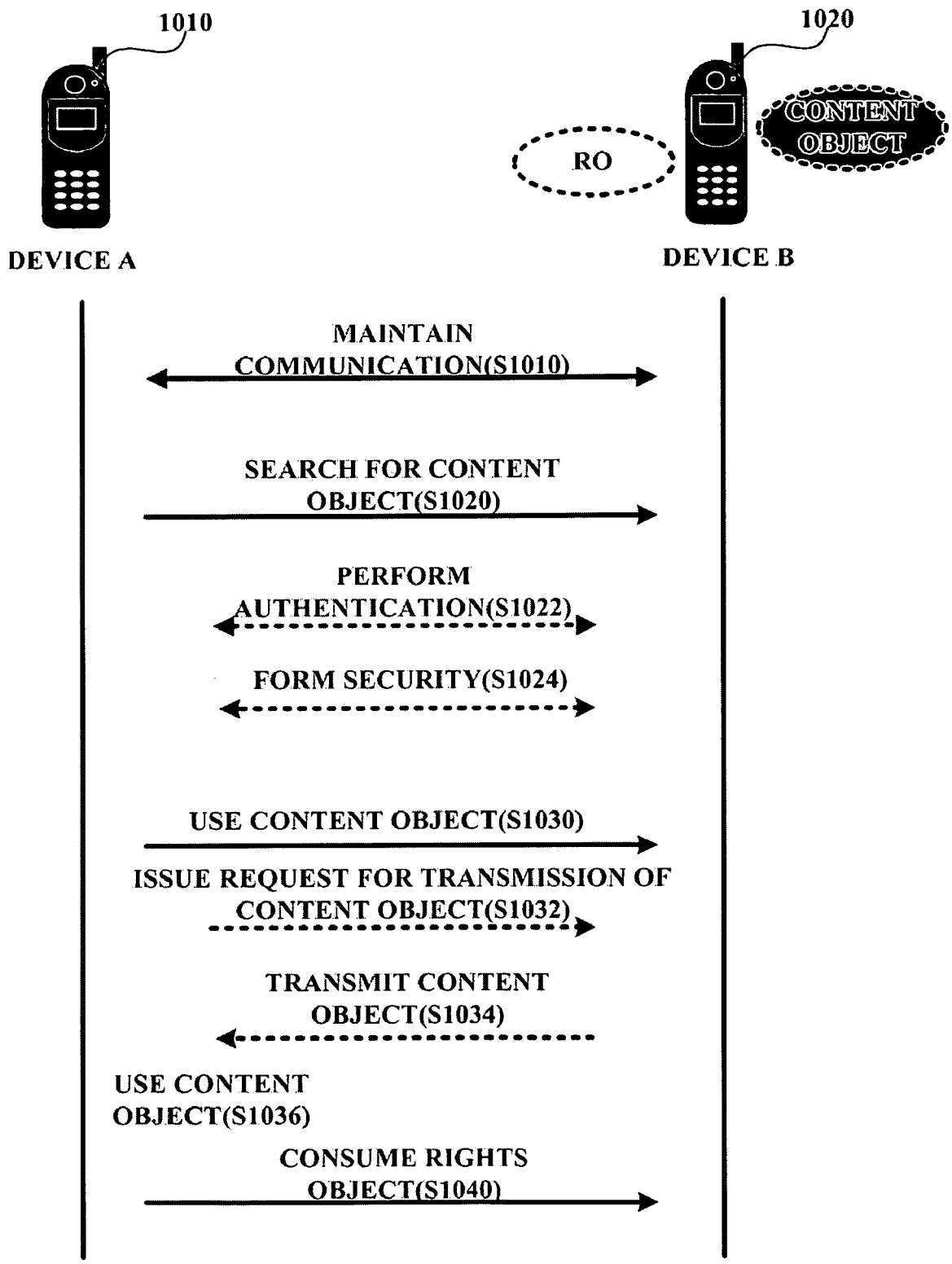
FIG. 10 is a flowchart illustrating a method of using content objects stored in one device by means of another device according to an exemplary embodiment of the present invention.

Referring to FIG. 10, in operation S1010, device A (1010) which has a function of using content objects communicates with device B (1020) which includes both content objects and respective corresponding ROs. The communication between device A (1010) and device B (1020) may be carried out via interface modules 470 of device A (1010) and device B (1020), respectively. The communication between device A (1010) and device B (1020) may be via wire medium or wireless medium. In addition, the communication between device A (1010) and device B (1020) may be carried out using an internet (IP) protocol, a universal serial bus (USB), or a memory card interface. In operation S1020, a control module 400 of device A (1010) searches device B (1020) for a content object desired by device A (1010). When device A (1010) discovers the desired content object from device B (1020) and chooses the searched content object, device A (1010) and device B (1020) may authenticate each other in operation S1022, and security formation modules 420 of device A (1010) and device B (1020) may form security between device A (1010) and device B (1020), as shown in operation S1024. As described above, the formation of security between device A (1010) and device B (1020) may involve generating a security key and making device A (1010) and device B (1020) share the security key.

In operation S1030, a content object use module 440 of device A (1010) uses the searched content object. In operation S1040, device A (1010) consumes an RO corresponding to the searched content object.

In operation S1030, device A (1010) may issue a request for transmission of the searched content object to device B (1020) (operation S1032). Operation S1032 is optional, and thus, device B (1020) may transmit the searched content object entirely or partially to device A (1010) regardless of whether device A (1010) issues a request for transmission of the searched content object to device B (1020). In operation S1036, a transceiving module 430 of device A (1010) receives the searched content object from device B (1020) and uses the received content object.

The descriptions of the methods of transmitting an RO between devices and using a content object according to the present invention may directly apply to a computer-readable recording medium storing a computer program for executing each of the methods of transmitting an RO between devices and using a content object according to the present invention.

In order that devices can communicate with each other to transmit/receive an RO to/from each other, it is advantageous for the devices to authenticate each other first. Since authentication between devices is very similar to authentication between a device and a multimedia card, only the authentication between a device and a multimedia card will now be described in detail.

Figure 11:
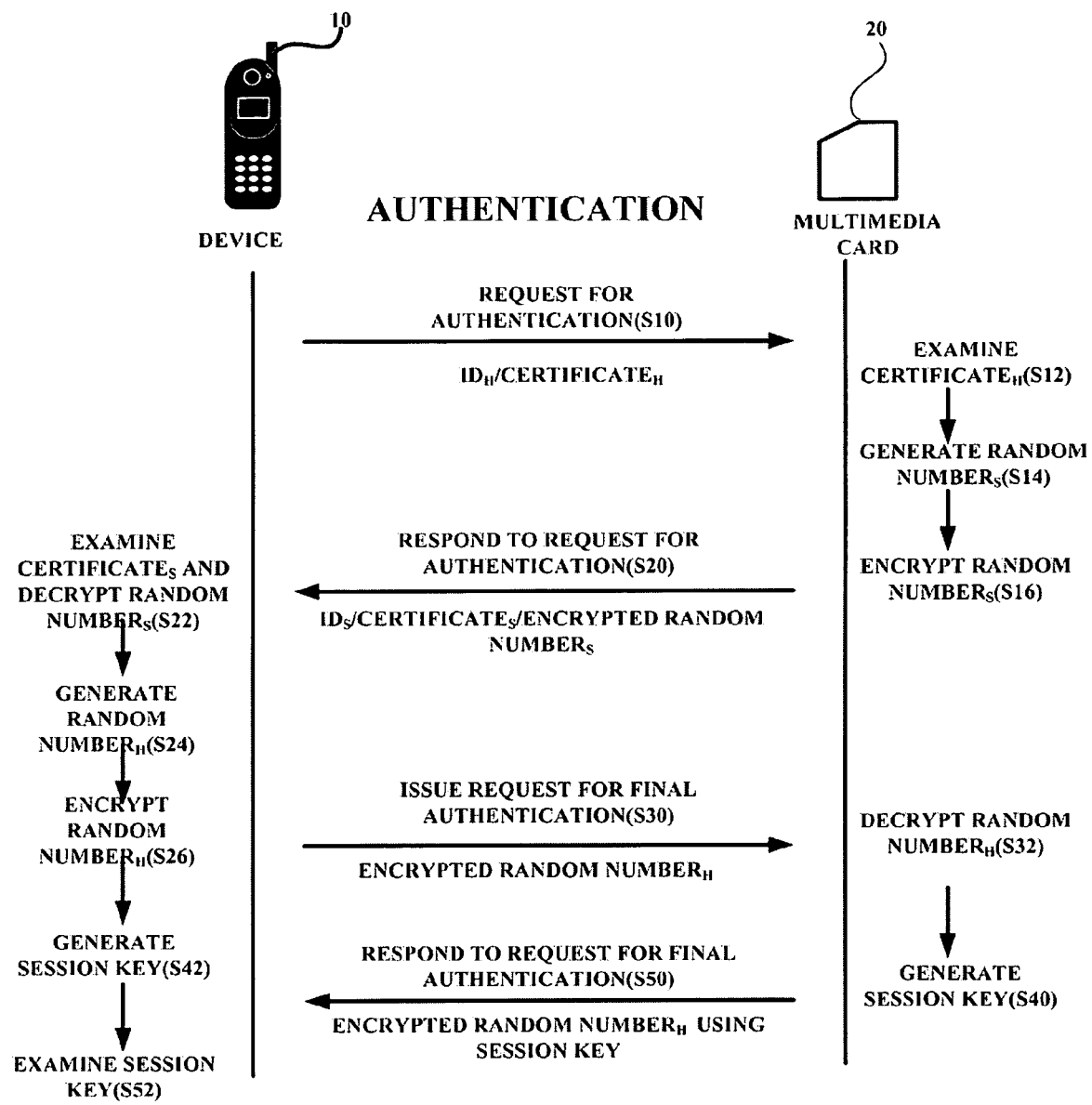
FIG. 11 is a diagram illustrating an authentication procedure performed between a device and a multimedia card according to an exemplary embodiment of the present invention.

FIG. 11 is a diagram illustrating an authentication procedure performed between a device 10 and a multimedia card 20 according to an exemplary embodiment of the present invention. Here, a subscript "H" of an object indicates that the object is possessed or generated by a host (device) and a subscript "S" of an object indicates that the object is possessed or generated by a multimedia card.

Referring to FIG. 11, an identifier $ID_H$, a certificate $CERTIFICATE_H$, and an encrypted random number $ENCRYPTED\ RANDOM\ NUMBER_H$ are generated or possessed by a host, i.e., the device 10, and an identifier $ID_S$, a certificate $CERTIFICATE_S$, and an encrypted random number $RANDOM\ NUMBER_S$ are generated or possessed by the multimedia card 20.

FIG. 11 illustrates how the device 10 and the multimedia card 20 authenticate each other and exchange random numbers with each other. The random numbers may be used for generating a session key. In FIG. 11, a plurality of horizontal arrows respectively represent a plurality of processes of the authentication between the device 10 and the multimedia card 20 and accompany short descriptions of the processes and parameters and data transmitted in the processes. In addition, the direction of each of the horizontal arrows represents the direction in which parameters and data are transmitted between the device 10 and the multimedia card 20.

The device 10 may issue commands, and the multimedia card 20 may perform its operations in response to the commands issued by the device 10.

For example, in operation S10, the device 10 transmits an authentication request command to the multimedia card 20, and the multimedia card 20 transmits the identifier IDENTIFIER$_S$, the certificate CERTIFICATE$_S$, and the encrypted random number RANDOM NUMBER$_S$ of the multimedia card 20 to the device 10 in response to the authentication request command.

Alternatively, both the device 10 and the multimedia card 20 may issue commands. In this case, in operation S20, the multimedia card 20 may transmit the identifier IDENTIFIER$_S$, the certificate CERTIFICATE$_S$, and the encrypted random number RANDOM NUMBER$_S$ of the multimedia card 20 to the device 10 together with a authentication response command.

As described above, according to the present invention, it is possible to provide users with methods of transmitting ROs between devices, using content objects, and consuming ROs that can be applied to an environment where various types of devices such as mobile phones, home electronic appliances, small memory storage devices, and portable imaging devices are connected to one another based on the digital convergence concept by using DRM technology.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A method of moving a rights object corresponding to a content object, the method comprising:
performing authentication between a plurality of first mobile devices and a second mobile device, each mobile device having an authentication module, a security formation module, and a transceiving module, the authentication performed between authentication modules of each of the plurality of first mobile devices and an authentication module of the second mobile device;
securing a connection between the second mobile device and each of the plurality of first mobile devices by respective security formation modules;
sending a request for a rights object from the second mobile device to each of the plurality of first mobile devices;
moving the requested rights object from each of the authenticated first mobile devices to the authenticated second mobile device, the moved rights object including a consumption state of the rights object, wherein moving the requested rights object includes deactivating the rights object at each respective first mobile device, and
using the content object at the second mobile device according to the consumption state of at least one of the moved rights objects,
wherein securing the connection comprises generating a security key as a result of the authentication, and the two secured devices sharing the security key.

2. The method of claim 1, wherein the moving comprises communicating current state information which includes the consumption state of the rights object and the rights object, and wherein the communicating is performed at an option of a provider of the rights object.

3. A method of using a content object in a system including a plurality of mobile devices configured to request rights objects from other mobile devices, the method comprising:
determining whether the content object and a rights object corresponding to the content object are stored in a first mobile device of the plurality of mobile devices;
if the content object is stored in the first mobile device, but the rights object is not stored in the first mobile device, the first mobile device sending request information for use permission of the content object to a plurality of second mobile devices of the plurality of mobile devices, each second mobile device storing the rights object corresponding to the content object;
in response to the request information, receiving at the first mobile device the rights object from each of the second mobile devices and deactivating the rights object at each of the second mobile devices, each received rights object including use permission information and current state information indicating a consumption state of the received rights object; and
the first mobile device using the stored content object according to the consumption state of at least one of the received rights objects wherein the sending further comprises:
the first mobile device authenticating each of the second mobile devices; and
securing a connection between the first mobile device and each of the second mobile devices, and
wherein the securing the connection comprises:
generating a security key as a result of the authentication; and
the first mobile device and each second mobile device sharing the security key.

4. The method of claim 3, wherein the request information for use permission of the content object is transmitted in a secure state.

5. The method of claim 3, wherein the request information for use permission of the content object is received in a secure state.

6. A mobile device comprising:
one or more processors;
an authentication module configured to authenticate a plurality of other mobile devices;
a security formation module configured to secure a connection between the mobile device and each of the other mobile devices that have been authenticated by the authentication module;
a transceiving module configured to transmit a rights object to at least a first mobile device of the plurality of other mobile devices for which the connection has been secured by the security formation module, in response to a request from the first mobile device, and to receive a rights object from each of the other mobile devices for which the connection has been secured by the security formation module, the transceiving module configured to receive, from each of the other mobile devices, current state information including a consumption state of the rights object received from that device, wherein transmitting the rights object to the at least first mobile device of the plurality of other mobile devices includes moving the rights object to the at least first mobile device and deactivating the rights object at the mobile device; and a content object use module configured to use a content object according to the consumption state associated with at least one of the received rights objects, wherein at least one of the authentication module, the security formation module, and the transceiving module is implemented as a hardware component, and wherein the security formation module is configured to generate a security key as a result of the authentication performed by the authentication module and make the device that comprises the security formation module and the another mobile device that has been authenticated share the security key.

7. The mobile device of claim 6, wherein a provider of the rights object is configured to choose whether to transmit current state information together with the rights object.

8. A first user device for using a content object comprising:
one or more processors;
a rights object management module which is configured to manage a plurality of rights objects by searching for devices storing a desired content object and a rights object corresponding thereto;
a transceiving module which is configured to send request information for use permissions of the desired content object to a plurality of second user devices on which the plurality of respective rights objects are stored and to receive, for each rights object from the second user device on which the rights object is stored, the use permissions of the desired content object and current state information which includes a consumption state of the rights object, wherein the use permissions and current state information correspond to a deactivated rights object at the second user device;
a content object use module which is configured to use the desired content object according to the consumption state of at least one of the rights objects;
an authentication module which is configured to authenticate the first user device and each of the plurality of second user devices; and
a security formation module which is configured to secure a connection between the first user device and each of the second user devices,
wherein the first user device is configured to authenticate a third user device, form a secure connection with the third user device, and receive a request for at least one of a content object and a rights object from the third user device using the secure connection, and
wherein the security formation module is configured to generate a security key as a result of the authentication performed by the authentication module and make the first user device and each of the second user devices share the security key.

9. The device of claim 8, wherein the transceiving module is configured to transmit the request information for the use permission of the desired content object in a secure state.

10. The device of claim 8, wherein the transceiving module is configured to transmit the use permission of the desired content object in a secure state.

11. An apparatus for using a content object comprising:
one or more processors;
an interface module configured to communicate with a first mobile device that includes one or more content objects, and one or more second mobile devices that include one or more rights objects;
a control module configured to search in the first mobile device and the plurality of second mobile devices for a desired content object and a plurality of rights objects corresponding to the desired content object;
a transceiver module configured to receive, from searched second mobile devices, the plurality of rights objects and current state information which includes a consumption state of each of the plurality of rights objects, the received rights objects corresponding to the desired content object found as a result of the search, and corresponding to respective deactivated rights objects of the searched second mobile devices;
a content object use module configured to use the desired content object found as a result of the search, in accordance with the consumption state of at least one of the received rights objects;
an authentication module configured to authenticate the first mobile device when the control module searches the first mobile device for the desired content object; and
a security formation module configured to secure a connection for the first mobile device if the first mobile device is successfully authenticated by the authentication module,
wherein the security formation module is configured to generate a security key as a result of the authentication performed by the authentication module and make the first mobile device and each of the second mobile devices share the security key.

12. The method of claim 1, wherein the rights object is transmitted from a service provider to the first mobile device before the moving the rights object from the first authenticated mobile device to second authenticated mobile device.

* * * * *